No. 806,790. PATENTED DEC. 12, 1905.
H. F. FOERSTERLING.
TELEPHONE BRACKET.
APPLICATION FILED MAR. 6, 1905.
2 SHEETS—SHEET 1.
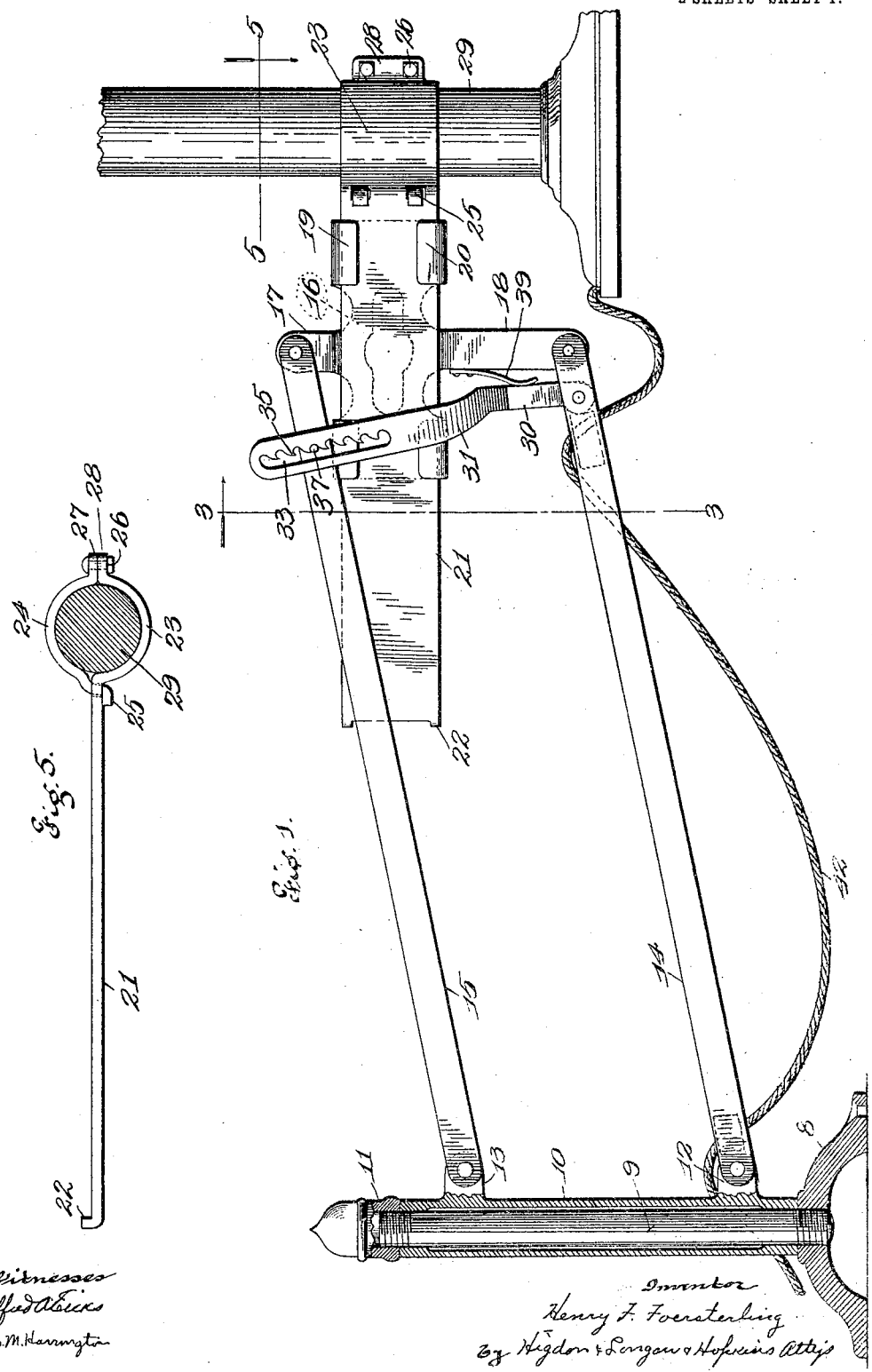

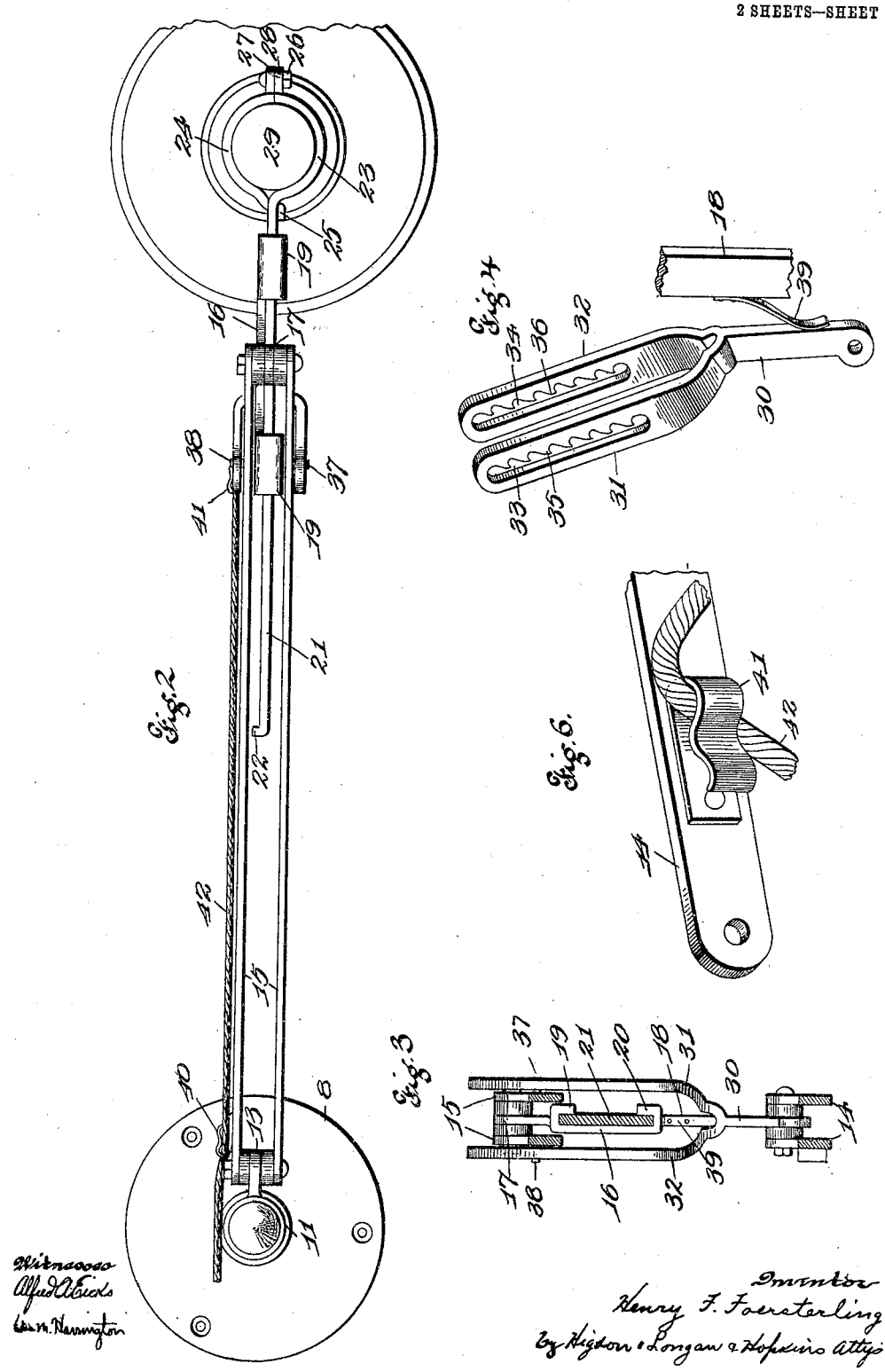

UNITED STATES PATENT OFFICE.

HENRY F. FOERSTERLING, OF ST. LOUIS, MISSOURI.

TELEPHONE-BRACKET.

No. 806,790.  Specification of Letters Patent.  Patented Dec. 12, 1905.

Application filed March 6, 1905. Serial No. 248,686.

*To all whom it may concern:*

Be it known that I, HENRY F. FOERSTERLING, a citizen of the United States, and a resident of the city of St. Louis, Missouri, have invented certain new and useful Improvements in Telephone-Brackets, of which the following is a specification containing a full, clear, and exact description, reference being had to the accompanying drawings, forming a part hereof.

My invention relates to improvements in telephone-brackets; and it consists of the novel features herein shown, described, and claimed.

In the drawings, Figure 1 is a view, partly in elevation and partly in section, of a telephone-bracket embodying the principles of my invention and illustrating its use. Fig. 2 is a top plan view of the parts shown in Fig. 1. Fig. 3 is a cross-section on line 3 3 of Fig. 1. Fig. 4 is a perspective of the adjusting-latch. Fig. 5 is a horizontal section on the line 5 5 of Fig. 1 and looking downwardly. Fig. 6 is a perspective of the line-holder.

Referring to the drawings in detail, the base 8 is adapted to be secured rigidly to a desk or table or other suitable support. The swivel-post 9 is tapped into the center of the base and extends upwardly a considerable distance. The swivel-casing 10 is rotatably mounted upon the post 9, and a cap 11 is screw-seated upon the upper end of the post to hold the casing in position. Ears 12 and 13 extend horizontally from the casing 10. The parallel bars 14 and 15 are connected to the ears 12 and 13 by hinge-pins. The horizontal supporting-plate 16 has an arm 17 extending upwardly and connected to the bars 15 and an arm 18 extending downwardly and connected to the bars 14. The bars 14 and 15 are made in pairs, so as to brace each other laterally, and washers are inserted on each side of the ears 12 and 13 and upon each side of the arms 17 and 18 to increase the distance between the pairs of bars. When the outer ends of the bars 14 and 15 are raised or lowered, the plate 16 will maintain its horizontal position. Lips 19 and 20 are bent laterally and inwardly from the ends of the plate 16 to form a slideway to receive the sliding plate 21, there being stops 22 upon the rear end of the plate to prevent its being withdrawn entirely from the slideway. The forward end of the plate 21 is bent to a semicircle to form the half-bearing 23, and a second half-bearing 24 has hooks 25 inserted through openings in the plate, and bolts 26 connect the ear 27 upon the half-bearing 24 to the ear 28 upon the half-bearing 23, so as to form the clamp to receive and hold the post 29 of the telephone instrument.

A latch 30 is pivotally connected to the bars 14, said latch having arms 31 and 32 extending upwardly outside of the bars 15, said arms being slotted longitudinally, as at 33 and 34, and provided with teeth 35 and 36, which extend into the slots. Latching-pins 37 and 38 extend outwardly from the bars 15 into the slots 33 and 34, and the teeth 35 and 36 engage the pins, so that the position of the telephone instrument may be adjusted up and down by moving the latch to bring different teeth into engagement with the pins. A spring 39, rigidly mounted, engages the latch 30 to hold it yieldingly in its latched position, so that when it is desired to raise or lower the telephone instrument the arms 31 and 32 are engaged and pressed against the spring to bring the pins out of engagement with the teeth. Then the instrument is raised or lowered to the desired position and the latch released. Line-holders 40 and 41 are attached to the sides of one of the bars 14 to receive the telephone-line 42, said line-holders being strips of springy metal bent upon itself to form spring-clips, into which the line will snap and stay until forcibly withdrawn.

The telephone instrument may be moved in a circle by turning the casing 10 upon the post 9. It may be moved to or from the base by sliding the plate 21 relative to the plate 16, and it may be raised or lowered by manipulating the latch 30

I claim—

1. In a telephone-bracket, a post, a sleeve mounted for rotation thereon, pairs of parallel bars pivotally secured to said sleeve, a vertical bar pivotally secured to the outer ends of said bars, a horizontal bearing formed on the vertical bar, a plate arranged to slide through said bearing, a clamp on the end of said plate for engaging the telephone instrument, and a spring-actuated ratchet-plate pivotally secured to one of the pairs of first-mentioned bars, and pins projecting outwardly from the other pair of said bars for engaging between the teeth of the ratchet-plate; substantially as specified.

2. In a telephone-bracket, a post, a sleeve rotating thereon, two sets of parallel bars pivotally secured to the sleeve and extending outwardly therefrom, a pair of ratchet-plates extending upwardly alongside the upper pair of parallel bars, which ratchet-plates are united at their lower ends and pivotally secured to the lower pair of parallel bars, pins projecting outwardly from the upper pair of parallel bars for engagement between the teeth of the ratchet-plates, a vertically-arranged bar pivotally secured at its ends to the outer ends of the pairs of parallel bars, a spring fixed to said vertically-arranged bar and bearing on the ratchet-plates, a horizontal bearing formed integral with the vertically-arranged bar, a plate arranged to slide through said bearing, and a clamp arranged at one end of the sliding plate for engaging the telephone instrument; substantially as specified.

In testimony whereof I have signed my name to this specification in presence of two subscribing witnesses.

HENRY F. FOERSTERLING.

Witnesses:
 ALFRED A. EICKS,
 EDW. M. HARRINGTON.